Patented Feb. 23, 1932

1,846,073

UNITED STATES PATENT OFFICE

ARTHUR ZITSCHER, OF OFFENBACH-ON-THE-MAIN, AND ROBERT SCHMITT, OF DARMSTADT, GERMANY, ASSIGNORS TO GENERAL ANILINE WORKS, INC., OF NEW YORK, N. Y., A CORPORATION OF DELAWARE

AZODYESTUFFS INSOLUBLE IN WATER AND PROCESS OF MAKING SAME

No Drawing. Application filed April 3, 1929, Serial No. 352,317, and in Germany April 7, 1928.

The present invention relates to azo dyestuffs insoluble in water and to a process of preparing the same.

We have found that valuable azo dyestuffs insoluble in water are obtained by combining any diazo-, tetrazo- or diazo azo compound not containing sulfonic or carboxylic groups with a dihydroxy quinoline compound of the probable general formula:

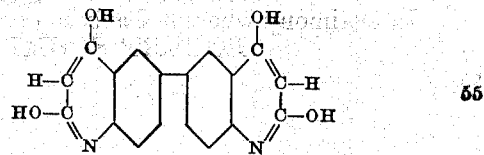

wherein R means a diaryl residue which may contain further substituents. Especially suitable for our process are those dihydroxy quinoline compounds which contain a diaryl residue of the diphenyl series. The dihydroxy quinoline compounds used in our process may be prepared, for example, in an analogous manner as described in "Berichte der Deutschen Chemischen Gesellschaft", vol. 60, page 832 or 1108.

Whereas 2.4-dihydroxy quinoline itself yields useless dyeings when employed for the manufacture of ice-colors, according to our process valuable pigment dyestuffs are obtained by means of the usual substrata, or fast dyeings and printings on the fiber by producing the dyestuffs according to the ice-color method. In consequence of the substantive properties of the combining components the goods padded therewith may be developed without being previously dried.

In order to further illustrate our invention the following examples are given, all temperatures being in centigrade degrees, but it may be understood that our invention is not limited to the particular products or conditions of reaction mentioned therein.

*Example*

Cotton yarn previously treated in a suitable manner is impregnated with a solution containing per liter 3.5 grs. of 2.4-2'.4'-tetrahydroxy-6.6'-diquinolyl of the probable formula

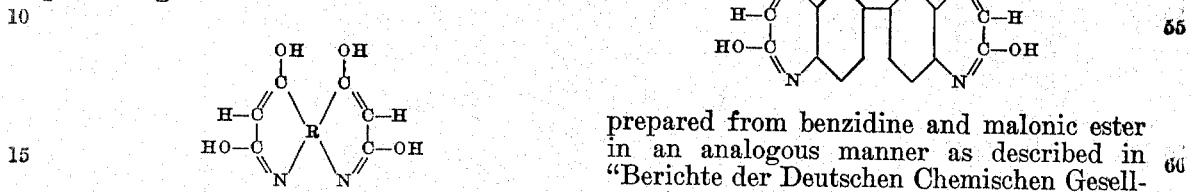

prepared from benzidine and malonic ester in an analogous manner as described in "Berichte der Deutschen Chemischen Gesellschaft", vol. 60, page 1108, 5.5 ccm. of a caustic soda solution of 34° Bé., 3.5 ccm. of Turkey red oil and 28 grs. of Glauber's salt. Then it is wrung out and developed in the presence of acetic acid with a solution containing per liter a hundredth molecular proportion of diazotized 1-amino-anthraquinone.

In this manner a brownish red-orange dyeing of a very good fastness is obtained.

The following table shows the shades of dyeings prepared in the same way from the same padding solution and from the diazo compounds of the following bases:

| Base | Shade |
|---|---|
| 2-amino-diphenyl-ether. | Orange-yellow. |
| 2.5-dichloro-aniline. | Brownish-orange. |
| 5-nitro-2.amino-toluene. | Brownish-orange. |
| o-amino-azo-toluene. | Yellowish-red. |

We wish it to be understood that in the following claims the term: "combining" means everywhere combining in substance or on the substratum especially on the vegetable fiber and that the term "diazotized compound" comprises diazo as well as tetrazo and diazoazo compounds.

We claim:

1. A process which comprises combining a diazotized compound of the benzene or anthracene series not containing sulfonic or carboxylic groups with 2.4-2'4'-tetrahydroxy-6.6'-diquinolyl of the probable general formula

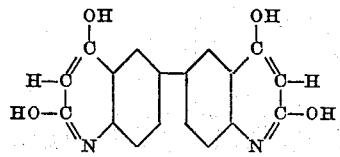

2. As new compounds the azo dyestuffs of the probable general formula

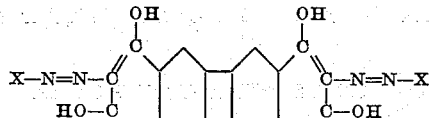

wherein the X's mean aryl residues of the benzene or anthracene series, which compounds are colored powders, insoluble in water, yielding valuable color lakes or when produced on the fiber fast dyeings and printings.

In testimony whereof I affix my signature.
ARTHUR ZITSCHER.
In testimony whereof I affix my signature.
ROBERT SCHMITT.